(12) United States Patent
Fujii

(10) Patent No.: US 12,456,758 B2
(45) Date of Patent: Oct. 28, 2025

(54) LAMINATE BATTERY MODULE

(71) Applicant: Prime Planet Energy & Solutions, Inc., Tokyo (JP)

(72) Inventor: Yusuke Fujii, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 774 days.

(21) Appl. No.: 17/730,119

(22) Filed: Apr. 26, 2022

(65) Prior Publication Data
US 2022/0344719 A1    Oct. 27, 2022

(30) Foreign Application Priority Data
Apr. 27, 2021  (JP) ................... 2021-074984

(51) Int. Cl.
| | |
|---|---|
| H01M 10/0585 | (2010.01) |
| H01M 10/0525 | (2010.01) |
| H01M 50/124 | (2021.01) |
| H01M 50/342 | (2021.01) |
| H01M 50/474 | (2021.01) |
| H01M 50/547 | (2021.01) |

(52) U.S. Cl.
CPC ... *H01M 10/0585* (2013.01); *H01M 10/0525* (2013.01); *H01M 50/124* (2021.01); *H01M 50/3425* (2021.01); *H01M 50/474* (2021.01); *H01M 50/547* (2021.01); *H01M 2200/20* (2013.01)

(58) Field of Classification Search
None
See application file for complete search history.

(56) References Cited

U.S. PATENT DOCUMENTS

| | | | |
|---|---|---|---|
| 2009/0246607 A1 | 10/2009 | Shinyashiki et al. | |
| 2018/0062135 A1* | 3/2018 | Nagashima | H01M 50/124 |
| 2021/0028517 A1* | 1/2021 | Choi | H01M 10/613 |
| 2021/0050573 A1* | 2/2021 | Lee | H01M 50/375 |

FOREIGN PATENT DOCUMENTS

JP    2009-245879 A    10/2009

\* cited by examiner

*Primary Examiner* — Nathanael T Zemui
(74) *Attorney, Agent, or Firm* — HAUPTMAN HAM, LLP (57) ABSTRACT

A laminate battery module has a plurality of laminate batteries, and a thermal expansion member. Each laminate battery has an exterior body, and an electrode body accommodated in the exterior body. The exterior body has a wide surface, and a sealing portion. The plurality of laminate batteries are arrayed sequentially so that the wide surfaces oppose each other, with an outgassing region being set in a pre-determined part of the periphery of the wide surfaces. The thermal expansion member is interposed between the wide surfaces of the plurality of laminate batteries, and protrudes in a region excluding the outgassing region. A portion of the thermal expansion member protruding in a region excluding the outgassing region expands when a pre-determined temperature is exceeded, and fills a region of the periphery of the laminate batteries, excluding the outgassing region.

14 Claims, 5 Drawing Sheets

LAMINATE BATTERY MODULE

BACKGROUND OF THE INVENTION

1. Field of the Invention

The present disclosure relates to a laminate battery module. The present application claims priority based on Japanese Patent Application No. 2021-074984 filed on Apr. 27, 2021, the entire contents of which are incorporated in the present specification by reference.

2. Description of the Related Art

Japanese Patent Application Publication No. 2009-245879 discloses a laminate-type battery in which an internal gas pressure detection part and voltage detection holes are formed in part of a welded portion of a laminate exterior body. An inner resin layer of a laminate film is not present in the internal gas pressure detection part, and the metal layers are in contact with each other, thereby being in a conductive state. The outer resin layer of the laminate film is absent in the voltage detection holes, and thus the metal layer is exposed. When the internal pressure rises in such a laminate-type battery, the voltage value of the metal layer changes due to peeling of the internal gas pressure detection part, it is considered that detecting such a voltage value change allows the charging and discharge to discontinue at the time of a rise in internal pressure.

SUMMARY

It is difficult to provide, in a laminate battery, a mechanism such as a gas-pressure actuated valve that is used in square batteries, for controlling the direction of outgassing derived from a malfunction occurring in the battery.

The inventors aspire to improve the safety of a laminate battery module in which multiple laminate batteries are electrically connected to each other.

A laminate battery module disclosed herein has a plurality of laminate batteries, and a thermal expansion member. Each of the plurality of laminate batteries has an exterior body made up of a laminate film; and an electrode body accommodated in the exterior body. The exterior body has a wide surface, and has a sealing portion provided in a periphery of the wide surface, at which the laminate film is overlaid thereby, to seal a space in which the electrode body is accommodated. The electrode body has a positive electrode collector tab and a negative electrode collector tab protruding from the sealing portion. The plurality of laminate batteries are arrayed sequentially so that the wide surfaces oppose each other, with an outgassing region being set in a pre-determined part of the periphery of the wide surfaces. The thermal expansion member is interposed between the wide surfaces of the plurality of laminate batteries, and protrudes in a region excluding the outgassing region. A portion of the thermal expansion member protruding in a region in the periphery of the wide surfaces, excluding the outgassing region expands when a pre-determined temperature is exceeded, and fills a region of the periphery of the laminate battery, excluding the outgassing region.

In such a laminate battery module the outgassing direction is controlled upon generation of gas derived from a malfunction in a laminate battery. The safety of the laminate battery module is improved as a result.

The positive electrode collector tab and the negative electrode collector tab may overlap the thermal expansion member in plan view.

The positive electrode collector tab and the negative electrode collector tab may protrude from the same side of the sealing portion. The outgassing region may be set on a side opposite the side from which the positive electrode collector tab and the negative electrode collector tab protrude.

An exterior case may be further provided in which the laminate battery and the thermal expansion member are accommodated in a sealed state. The exterior case may have a safety valve.

The safety valve may be provided at a position surrounding the outgassing region.

The thermal expansion member may have, at a portion protruding from the wide surface, a portion which is thicker than a portion that does not protrude from the wide surface.

DESCRIPTION OF THE PREFERRED EMBODIMENTS

An embodiment of a laminate battery module disclosed herein will be explained next. In the drawings below, members and portions that elicit identical effects are denoted with identical reference symbols, and a recurrent explanation thereof swill be omitted or simplified. The dimensional relationships (length, width, thickness and so forth) in the figures do not reflect actual dimensional relationships. In the figures, the reference symbol X denotes a "length direction" of a laminate battery, the reference symbol Y denotes a "width direction" of the laminate battery, and the reference symbol Z denotes a "thickness direction" of the laminate battery or an "arraying direction" of a plurality of laminate batteries. These directions are defined merely for convenience of explanation and, unless noted otherwise, do not limit the disclosure of the present application. Unless noted otherwise, in the present specification a numerical value range notated as "A to B" denotes a value of at least A and not more than B.

In the present specification the term "laminate battery" refers to a battery in general having a structure in which a laminate film is used as an exterior body, and an electrode body is accommodated in the interior thereof. The laminate battery may be for instance a storage battery secondary battery) such as a lithium ion secondary battery or a nickel-metal hydride battery, or a power storage element such as an electrical double layer capacitor. For instance the secondary battery may be a secondary battery in which a so-called liquid-based electrolyte solution is used, or may be an all-solid-state battery in which a solid electrolyte is used. The present art will be explained hereafter on the basis of examples of an instance where the laminate batters is a lithium ion secondary battery in which a liquid-based electrolyte solution is used.

Laminate Battery 10

Figure 1:
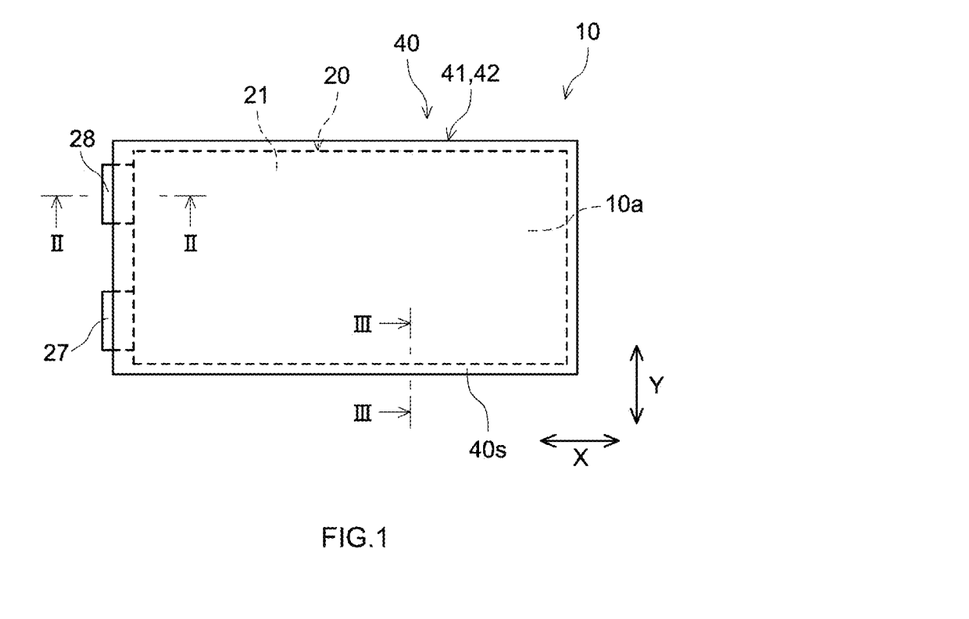
FIG. 1 is a plan-view diagram illustrating schematically a laminate battery 10.
Figure 2:
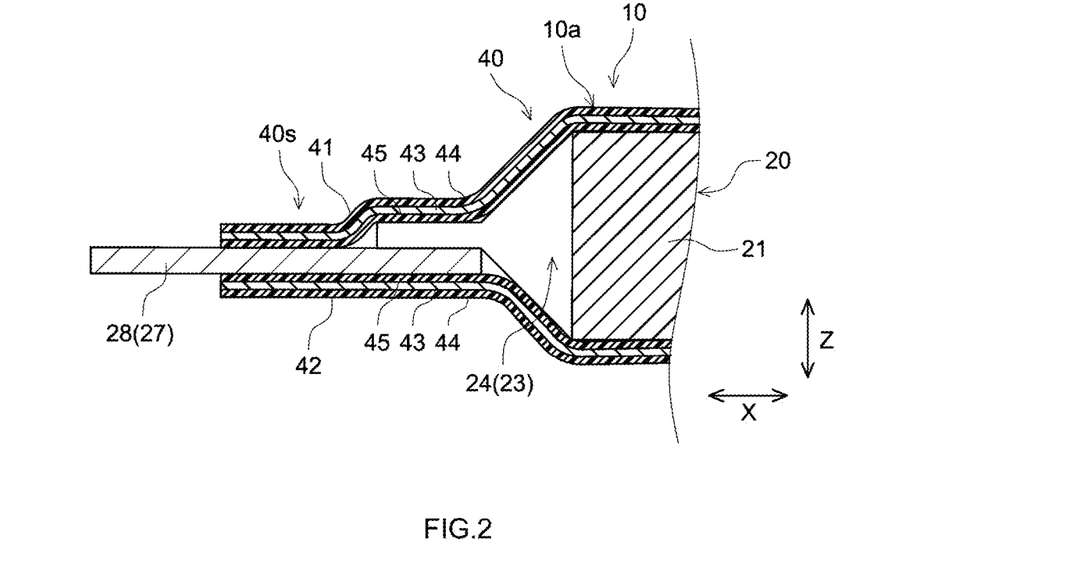
FIG. 2 is a cross-sectional diagram illustrating a II-II cross section of FIG. 1.
Figure 3:
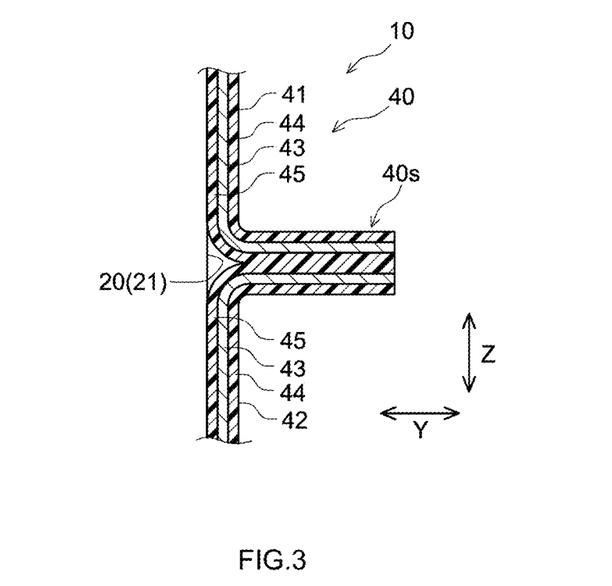
FIG. 3 is a cross-sectional diagram illustrating a III-III cross section of FIG. 1.

FIG. 1 is a plan-view diagram illustrating schematically a laminate battery 10. FIG. 2 is a cross-sectional diagram illustrating a II-II cross section of FIG. 1. FIG. 2 illustrates a cross section of a portion of the laminate battery 10 to which electrode collector tabs (positive electrode collector tab 27 and negative electrode collector tab 28) are connected. FIG. 3 is a cross-sectional diagram illustrating a cross section of FIG. 1. FIG. 3 illustrates a cross section of a portion, of the laminate battery 10, at which the positive electrode collector tab 27 and the negative electrode collector tab 28 are not connected. The laminate battery 10 includes an exterior body 40 and an electrode body 20. The electrode body 20 is accommodated in the exterior body 40 together with an electrolyte solution, not shown.

Electrode Body 20

As illustrated in FIG. 1 and FIG. 2, the electrode body 20 has an electrode multilayer portion 21, the positive electrode collector tab 27, and the negative electrode collector tab 28. The electrode multilayer portion 21 has a structure that constitutes a power generation element for the laminate battery 10. The electrode multilayer portion 21 has for instance a configuration in which a positive electrode plate and a negative electrode plate are alternately stacked on each other via a separator. The electrode multilayer portion 21 has a wide rectangular flat surface in the stacking direction of the positive electrode plate of the negative electrode plate. The structure of the electrode multilayer portion 21 varies depending on the type of the battery, such as lithium ion secondary battery, a lithium polymer battery or a lithium ion capacitor. The structure of the electrode multilayer portion 21 is not particularly limited and can be modified as appropriate. A detailed depiction of the electrode multilayer portion 21 will be omitted herein.

Although not illustrated in the figures, each positive electrode plate includes a positive electrode core body and a positive electrode active material layer. For instance a metal foil of stainless steel (SUS), Ni, Cr, Au, Pt, Al, Fe, Ti, Zn or the like can be used as the positive electrode core body. An appropriate metal foil may be used, for instance in terms of the conductivity and oxidation resistance thereof, in the positive electrode core body. The positive electrode core body has a rectangular shape corresponding to the planar shape of the electrode multilayer portion 21 described above. In the present embodiment aluminum is used as the positive electrode core body. A non-formation portion 23 (see FIG. 2) at which the positive electrode active material layer is not formed is provided at one end of the rectangular shape of each positive electrode core body. The non-formation portion 23 likewise extends from part of a short side of the positive electrode core body. The non-formation portion 23 extends from part of a short side of the electrode multilayer portion 21. Non-formation portions 23 extending from respective positive electrode core bodies overlap each other, and are electrically connected to the positive electrode collector tab 27 described below. The positive electrode active material layer is a layer containing a positive electrode active material. The positive electrode active material layer is formed on both faces of each positive electrode core body, except at the non-formation portion 23. For instance a known positive electrode active material typified by a lithium-nickel-manganese-cobalt complex oxide can be appropriately used as the positive electrode active material that is included in the positive electrode active material layer. The positive electrode active material layer may contain for instance a solid electrolyte, a binder and a conductive material.

Although not illustrated in the figures, the negative electrode plate includes a negative electrode core body and a negative electrode active material layer. For instance a metal foil such as SUS, Cu, Ni, Fe, Ti, Co, Zn or the like can be used as the negative electrode core body. The negative electrode core body has a rectangular shape corresponding to the planar shape of the electrode multilayer portion 21 described above. In the present embodiment copper is used as the negative electrode core body. A non-formation portion 24 (see FIG. 2) at which the negative electrode active material layer is not formed is provided at one end of the rectangular shape of the negative electrode core body. The non-formation portion 24 extends from part of a short side of the negative electrode core body. The non-formation portion 24 likewise extends from part of a short side of the electrode multilayer portion 21. Non-formation portions 24 extending from respective negative electrode core bodies overlap each other, and are electrically connected to the negative electrode collector tab 28 described below. The negative electrode active material layer is a layer containing a negative electrode active material. The negative electrode active material layer is formed on both faces of each negative electrode core body, except at the non-formation portion 24. As the negative electrode active material layer there can be appropriately used for instance a known negative electrode active material typified by carbon-based negative electrode active materials such as graphite, hard carbon and soft carbon, and Si-based negative electrode active materials such as Si and silicon oxide. The negative electrode active material layer may contain for instance a solid electrolyte, a binder and a conductive material.

As the separator there can be used, without particular limitations, separators that are utilized as conventionally known secondary battery separators. For instance a resin-made porous sheet in turn made up of a polyolefin resin such as polyethylene (PE) or polypropylene (PP) can be used as the separator. The separator may have a base material portion made up of a resin-made porous sheet, and a heat resistance layer (HRL) provided on at least one surface of the base material portion, and containing an inorganic filler. For instance alumina, boehmite, aluminum hydroxide or titania can be used as the inorganic filler.

The positive electrode collector tab 27 is a plate-like member having a rectangular shape. As illustrated in FIG. 2, one surface of the positive electrode collector tab 27 is joined to the non-formation portion 23 on the positive electrode side in accordance with a method such as welding. The positive electrode collector tab 27 may be made of for instance the same metal as the positive electrode core body. In the present embodiment the positive electrode collector tab 27 is made up of aluminum. The negative electrode collector tab 28 is a plate-like member having a rectangular shape. One surface of the negative electrode collector tab 28 is joined to the non-formation portion 24 on the negative electrode side, in accordance with a method such as welding.

The negative electrode collector tab 28 may be made of for instance the same metal as that of the negative electrode core body. In the present embodiment the negative electrode collector tab 28 is made up of copper.

In the present embodiment the positive electrode collector tab 27 and the negative electrode collector tab 28 extend in the same direction from the same short side of the electrode multilayer portion 21. The positive electrode collector tab 27 and the negative electrode collector tab 28 extend from respective different positions, on the same side of the electrode multilayer portion 21, so as not to overlap each other. For instance the positions at which the positive electrode collector tab 27 and the negative electrode collector tab 28 are provided in the electrode multilayer portion 21, and the directions in which the positive electrode collector tab 27 and the negative electrode collector tab 28 extend from the electrode multilayer portion 21, are not particularly limited and can be modified as appropriate.

A conventionally known electrolyte solution can be used, without particular limitations, as the electrolyte solution that is accommodated together with the electrode body 20. For instance a nonaqueous electrolyte solution in which a supporting salt is dissolved in a nonaqueous solvent can be used as the electrolyte solution. Examples of the nonaqueous solvent include carbonate solvents such as ethylene carbonate, dimethyl carbonate and ethyl methyl carbonate. Examples of the supporting salt include fluorine-containing lithium salts such as $LiPF_6$.

Exterior Body 40

In the present embodiment the exterior body 40 is made up of two rectangular laminate films 41, 42 that are slightly larger than the electrode multilayer portion 21. The exterior body 40 has a wide surface 10a and a sealing portion 40s in the periphery of the wide surface 10a. The sealing portion 40s resulting from superposition of the laminate films 41, 42, seals the space in which the electrode body 20 is accommodated. In the present embodiment the electrode multilayer portion 21 of the electrode body 20 is sandwiched between, and wrapped by, the two laminate films 41, 42. The inner surfaces of the laminate films 41, 42 oppose and overlap each other. The sealing portion 40s is formed through heat fusion of the site of overlap (see FIG. 3). The term wide surface 10a denotes a wide surface of the surface of the laminate battery 10. In the present embodiment the wide surface 10a is a surface of the exterior body 40, that corresponds to a plane in the stacking direction of the electrode multilayer portions 21, in the thickness direction Z.

As illustrated in FIG. 2, the positive electrode collector tab 27 and the negative electrode collector tab 28 protrude from the sealing portion 40s towards the exterior of the exterior body 40. In the present embodiment the positive electrode collector tab 27 and the negative electrode collector tab 28 protrude from the same side of the sealing portion 40s. The positive electrode collector tab 27 and the negative electrode collector tab 28 are each sandwiched by the two laminate films 41, 42 at the sites where the positive electrode collector tab 27 and the negative electrode collector tab 28 protrude from the two laminate films 41, 42. At these sites, thermoplastic resin layers 45 of the two laminate films 41, 42 are heat-fused with the positive electrode collector tab 27 and the negative electrode collector tab 28. The airtightness of the laminate battery 10 is ensured as a result.

As illustrated in FIG. 2 and FIG. 3, the laminate films 41, 42 are each formed of a metal sheet 43 for preventing permeation of moisture or the like, an insulating resin layer 44 that covers the outer surface of the metal sheet, and the thermoplastic resin layer 45 that covers the inner surface of the metal sheet.

The metal sheet 43 has the role of imparting gas barrier properties to the laminate films 41, 42, to prevent the intrusion of oxygen, water and electrolyte solution. The metal sheet 43 may be a metal thin film such as an aluminum foil, a copper foil, a nickel foil, a stainless steel foil, a cladding foil of the foregoing, or an annealed foil or unannealed foil of the foregoing. The metal sheet 43 may be a metal foil plated with a conductive metal such as nickel, tin, copper or chromium.

The insulating resin layer 44 is an outer layer of each laminate film 41, 42. The insulating resin layer 44 has insulating properties, and has a melting point such that the insulating resin layer 44 does not melt at the time of melting and bonding of the thermoplastic resin layer 45. Examples of the resin used in the insulating resin layer 44 include polyamides, polyesters and other resins having a melting point sufficiently higher than that of the resin used in the thermoplastic resin layer 45. A stretched film of such resins can be used as the insulating resin layer 44.

Each thermoplastic resin layer 45 is an inner layer of the laminate films 41, 42. The thermoplastic resin layer 45 may have superior chemical resistance against corrosiveness, as required from batteries such as lithium ion secondary batteries. The thermoplastic resin layers 45, which are heat-welded to each other when the inner side surfaces of the laminate films 41, 42 are superimposed and bonded to each other, and have heat sealability. In terms of chemical resistance and heat sealability, the thermoplastic resin layers 45 are preferably made up of polyethylene, polypropylene or an olefin-based copolymer, or an acid-modified product or ionomer of the foregoing. Examples of olefin-based copolymers include EVA (ethylene-vinyl acetate copolymers), EAA (ethylene-acrylic acid copolymers) and EMAA (ethylene-methacrylic acid copolymers). A polyamide film (for instance, 12 nylon) or a polyimide film can also be used.

In the present embodiment the exterior body 40 is made up of two laminate films 41, 42, but the exterior body 40 is not limited to such a form. For instance the exterior body may be made up of a laminate film of a size that enables wrapping of both faces of the wide surface of the electrode bodywith one sheet. In this case, one laminate film is folded along one side of the electrode multilayer portion, so that the exterior body covers the electrode body. The space in which the electrode body is accommodated can then be sealed through heat fusion of three sides, excluding the side of folding.

Laminated Battery Module 100

Figure 4:
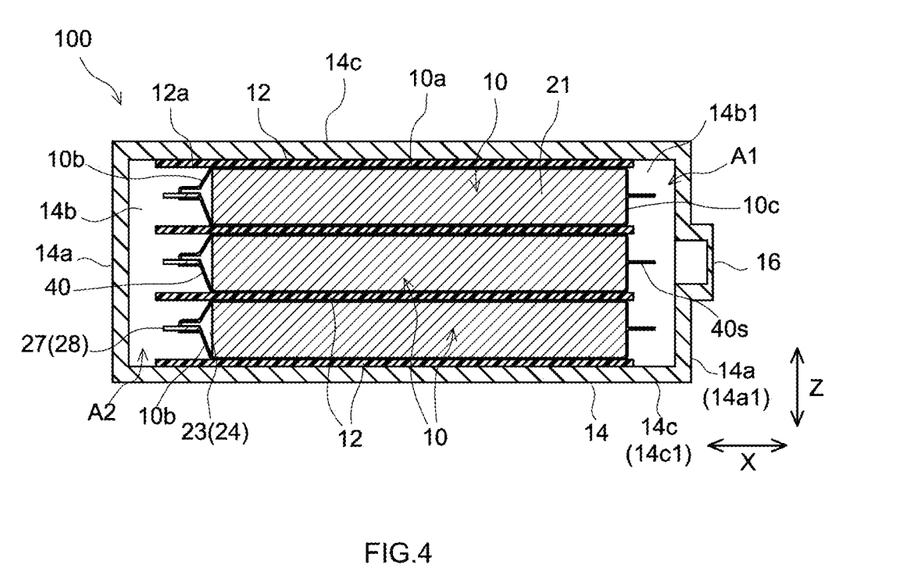
FIG. 4 is a cross-sectional diagram illustrating schematically a laminate battery module 100.
Figure 5:
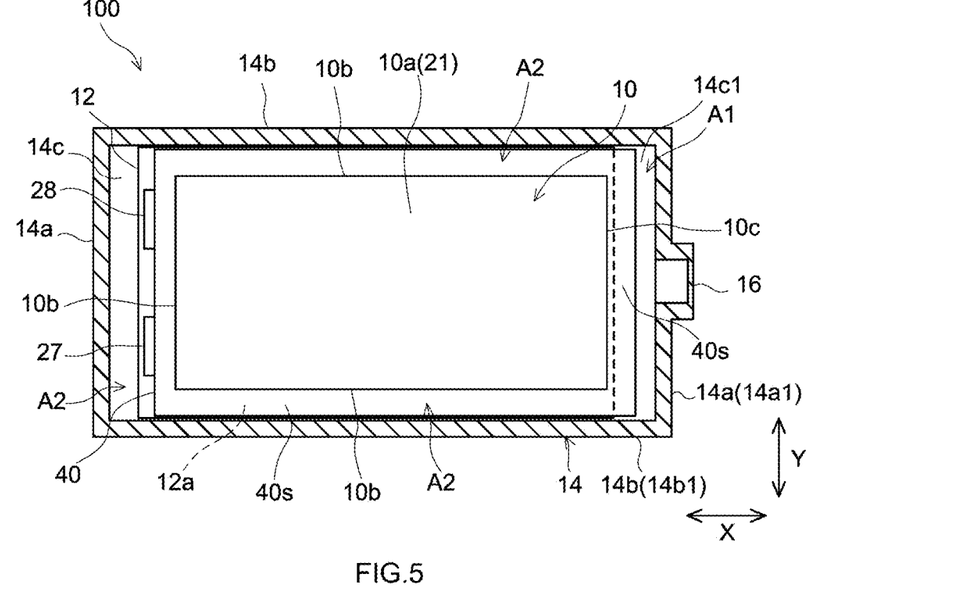
FIG. 5 is a cross-sectional diagram illustrating schematically a laminate battery module 100.
Figure 6:
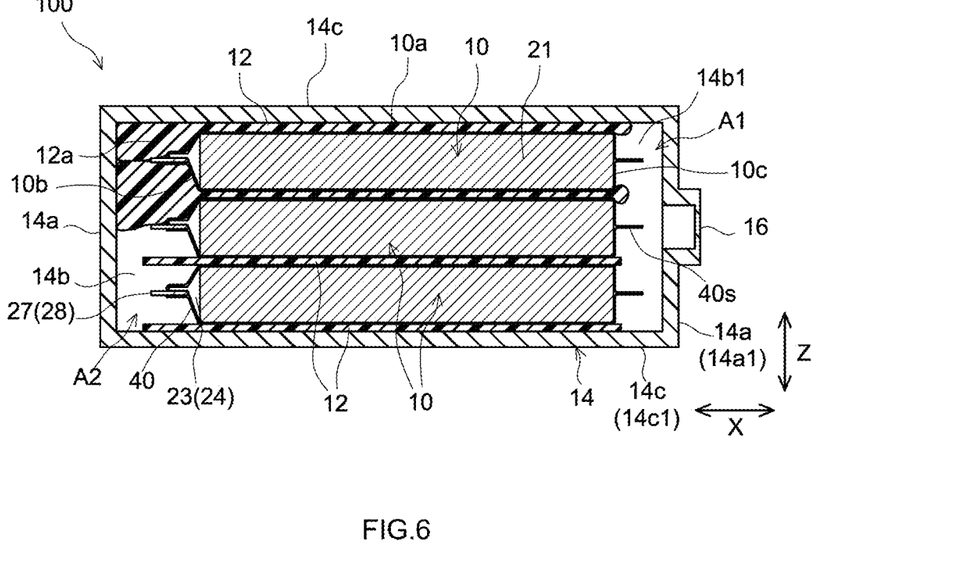
FIG. 6 is a cross-sectional diagram illustrating schematically a laminate battery module 100 upon expansion of thermal expansion members 12.

FIG. 4 and FIG. 5 are cross-sectional diagrams illustrating schematically a laminate battery module 100. FIG. 4 illustrates laminate batteries 10 and thermal expansion members 12 alternately laid up on each other. FIG. 5 illustrates the positional relationship between each laminate battery 10 and each thermal expansion member 12 in plan view from an arraying direction Z. FIG. 6 is a cross-sectional diagram illustrating schematically the laminate battery module 100 upon expansion of thermal expansion members 12. The laminate battery module 100 includes multiple laminate batteries 10, and thermal expansion members 12. The thermal expansion members 12 are interposed between respective wide surfaces 10a of the plurality of laminate batteries 10.

The laminate batteries 10 are arrayed sequentially in a state where respective wide surfaces 10a are set to oppose each other along the arraying direction Z. In the present embodiment the laminate battery module 100 further includes an exterior case 14. The exterior case 14 accommodates the plurality of laminate batteries 10 and the thermal expansion members 12 in a sealed state.

The laminate batteries 10 and the thermal expansion members 12 are alternately disposed along the arraying direction Z. Thermal expansion members 12 are also disposed outward of the laminate batteries 10 at both ends in the arraying direction Z; i.e. between the laminate batteries 10 at both ends in the arraying direction Z and the inner walls of the exterior case 14. The laminate batteries 10 are arrayed in a state where the directions in which the positive electrode collector tab 27 and the negative electrode collector tab 28 protrude are aligned with each other. Each laminate battery 10 is connected in series, via a bus bar not shown, with another laminate battery 10 adjacent thereto, across a respective thermal expansion member 12 in between. In the present embodiment one laminate battery 10 and one thermal expansion member 12 are alternately disposed along the arraying direction Z, but the embodiment is not limited to this form. A plurality of laminate batteries 10 may be disposed between respective thermal expansion members 12. For instance there may be alternately disposed a plurality of units of laminate batteries 10, each unit being two or more laminate batteries 10, and the thermal expansion members 12. Besides the laminate batteries 10 and the thermal expansion members 12, a spacer or the like may be interposed in between; also, structures such as end plates may be provided on the outermost side in the arraying direction Z.

Thermal Expansion Member 12

Each thermal expansion member 12 is a member for preventing that heat generated for instance on account of a malfunction in a laminate battery 10 should propagate, in a chain reaction manner, to other laminate batteries 10. The thermal expansion member 12 is a material that expands when heated, until reaching a predetermined temperature. The shape and thickness of the thermal expansion member 12 are set as appropriate for instance in accordance with the volume of the space surrounding the laminate battery 10, and an expansion factor. In the present embodiment the thermal expansion member 12 has a substantially rectangular sheet shape.

A material having flame retardancy and which does not burn readily is used as the thermal expansion member 12. For instance a resin material having a base of an epoxy resin, polyvinyl chloride, butyl rubber or the like, and that includes an inorganic material of high thermal expansion, and a volatile organic compound, can be used as the thermal expansion member 12. For instance Fi-Block, by Sekisui Chemical Co., Ltd., is used as the thermal expansion member 12.

The thermal expansion member 12 starts expanding when heated to a pre-determined temperature. The expansion start temperature is set to a temperature higher than the normal usage temperature of the laminate battery 10, and may be, for instance, 100° C. or higher, or 150° C. or higher. The expansion start temperature of the thermal expansion member 12 may be, for instance, 250° C. or lower, or 200° C. or lower.

The expansion factor of the thermal expansion member 12 is not particularly limited, but may be, for instance, 5 or more, or 15 or more. The expansion factor of the thermal expansion member 12 may be, for instance, 40 or less, or 30 or less. The expansion factor can be determined on the basis of the ratio of the volumes of the thermal expansion member 12 before and after heating. The expansion factor is determined by for instance heating the thermal expansion member 12 having a thickness of 1 mm, a width of 30 mm and a length of 30 mm at 250° C. for 10 minutes, and by dividing the volume of the thermal expansion member 12 after heating by the volume prior to heating.

Preferably, the thermal conductivity is reduced through expansion of the thermal expansion member 12, from the viewpoint of preventing the heat generated by one laminate battery 10 from propagating to another laminate battery 10. The thermal expansion member 12 preferably has a thermal conductivity after heating, with respect to the thermal conductivity prior to heating, lower than 1.0, more preferably lower than 0.7, and may be lower than 0.5. As an example, the thermal expansion member may have an epoxy resin base and exhibit a thermal conductivity before expansion of about 0.46 W/m·K and a thermal conductivity after expansion of about 0.22 W/m·K. In addition to a drop in the thermal conductivity, the thermal expansion member 12 affords increased thermal resistance by expanding in the thickness direction. The effect of preventing heat propagation between the laminate batteries 10 becomes more pronounced as a result.

Outgassing Region A1

An outgassing region A1 is for instance a region in which there is released gas having been generated due to a malfunction of the laminate battery 10. The outgassing region A1 is set in a pre-determined portion in the periphery of the wide surface 10a. As illustrated in FIG. 4 and FIG. 5, a thermal expansion member 12 protrudes from a region A2, in the periphery of the wide surface 10a, that excludes the outgassing region A1. A portion 12a of the thermal expansion member 12 protruding into the region A2 that excludes the outgassing region A1 expands when a pre-determined temperature is exceeded. As illustrated in FIG. 6, when the thermal expansion member 12 expands, the portion 12a that protrudes into the region A2 fills up the region A2 excluding the outgassing region A1, in the periphery of the wide surface 10a of the laminate battery 10 that has generated the heat. That is, a side surface 10b adjacent to the region A2 is covered by the expanded thermal expansion member 12, from among the sides of the heat-generating laminate battery 10. In the outgassing region A1, by contrast, the thermal expansion member 12 protrudes just slightly from the wide surface 10a. Therefore, a side surface 10c of the laminate battery 10 adjacent to the outgassing region A1 does not become covered even if the thermal expansion member 12 expands.

In the outgassing region A1, as illustrated in FIG. 4 and FIG. 5, a thermal expansion member 12 may protrude towards the side surface 10c to an extent such that the side surface 10c is not covered during expansion. Naturally, an end portion of the thermal expansion member 12 and the side surface 10c may coincide in the arraying direction Z. The outgassing region A1 need not be set in the periphery of one side of the wide surface 10a (in the present embodiment, outward of the side surface 10c), and may be set over a portion narrower than one side. In that case each thermal expansion member 12 may have a shape such that the thermal expansion member 12 protrudes from the wide surface 10a except at the narrow portion. Further, the outgassing region A1 is not limited to one location in the periphery of the wide surface 10a, and may be set at two or more locations. The thermal expansion member 12 preferably covers at least the wide surface 10a of the laminate battery 10, from the viewpoint of preventing that heat generated by one laminate battery 10 should propagate to another laminate battery 10.

In the present embodiment, the outgassing region A1 is set on the short side opposite the short side at which the positive electrode collector tab 27 and the negative electrode collector tab 28 protrude. Each thermal expansion member 12 overlaps the wide surface 10a, the positive electrode collector tab 27, and the negative electrode collector tab 28 in plan view. At the time of expansion of thermal expansion members 12, therefore, the positive electrode collector tab 27 and the negative electrode collector tab 28 become sandwiched between thermal expansion members 12 having expanded from either side in the arraying direction Z.

Exterior Case 14

The exterior case 14 is a housing that accommodates a plurality of laminate batteries 10 and thermal expansion members 12. In the present embodiment the exterior case 14 has a flat and bottomed cuboid (square) outer shape. Conventionally known materials can be used in the exterior case 14, without particular limitations. For instance the exterior case 14 may be made of a metal. For instance aluminum, an aluminum alloy, iron, an iron alloy or the like is used as the exterior case 14. The exterior case 14 includes a pair of side walls 14a perpendicular to a length direction X, a pair of side walls 14b perpendicular to a width direction Y, and a pair of side walls 14c perpendicular to the arraying direction Z.

The exterior case 14 accommodates the laminate batteries 10 and the thermal expansion members 12, integrated with each other, in a sealed state. The laminate batteries 10 and the thermal expansion members 12 may be held integrally by a restraint band (not shown), so that restraining pressure is applied in the direction in which the laminate batteries 10 are arrayed; alternatively, a holding mechanism may be resorted to in which a plate-like spacer (not shown) may be disposed between the exterior case 14 and respective thermal expansion members 12, such that the exterior case 14 is pressed thereby.

The exterior case 14 has a safety valve 16. The safety valve 16 is a valve designed to cause a pre-determined portion of the exterior case 14 to break, at a pre-determined pressure, in the case of an event where a large amount of gas is generated rapidly within the exterior case 14. The safety valve 16 causes part of the exterior case 14 to break at a pre-determined pressure, to release gas from the interior of the of the exterior case 14. By virtue of the fact that the pre-determined portion of the exterior case 14 breaks on account of the safety valve 16, the exterior case 14 can thus be prevented from undergoing significant damage at remaining sites. The safety valve 16 is preferably provided at any of positions 14a1, 14b1, 14c1 surrounding the outgassing region A1, at the side walls 14a to 14c. In the present embodiment the safety valve 16 is provided at a position 14a1 opposing the side surface 10c of the laminate batteries 10.

As described above, the laminate battery module 100 has a plurality of laminate batteries 10 arrayed sequentially, such that respective wide surfaces 10a oppose each other, and thermal expansion members 12 interposed between respective wide surfaces 10a of the plurality of laminate batteries 10. The outgassing region A1 is set in the periphery of the wide surface 10a of the laminate batteries 10. For instance when heat is generated on account of a malfunction in one laminate battery 10 that makes up the laminate battery module 100, and adjacent thermal expansion members 12 reach a pre-determined temperature, the thermal expansion members 12 expand in the thickness direction Z. As a result, the heat generated in the defective laminate battery 10 does not propagate readily to other laminate batteries 10. When the thermal expansion members 12 expand, the side surface of the laminate battery 10 in which the malfunction has occurred becomes covered with the thermal expansion members 12, except at the outgassing region A1. As a result, gas that may be generated from the defective laminate battery 10 can be controlled so as to be released through the outgassing region A1 side. Damage to the portion of the exterior body 40 covered by the thermal expansion members 12 can also be suppressed.

In the present embodiment, the laminate battery module 100 includes an exterior case 14 that accommodates the laminate batteries 10 and the thermal expansion members 12 in a sealed state, and the exterior case 14 has the safety valve 16. The safety valve 16 is provided at any of positions 14a1, 14b1, 14c1 surrounding the outgassing region A1. That is, the safety valve 16 is provided in a direction in which the gas is released. Therefore, the safety valve 16 can be quickly caused to break when a malfunction occurs in the laminate battery 10. As a result, this allows preventing rises of internal pressure in the exterior case 14, damage to other laminate batteries 10, or transmission of heat to other laminate batteries 10.

In the present embodiment the positive electrode collector tab 27 and the negative electrode collector tab 28 overlap respective thermal expansions members 12 in plan view. When thermal expansion members 12 expand, therefore, the positive electrode collector tab 27 and the negative electrode collector tab 28 can be covered and protected by the thermal expansion members 12.

The outgassing region A1 is set on the side opposite the side from which the positive electrode collector tab 27 and the negative electrode collector tab 28 protrude. That is, the outgassing direction is set to a direction in which there are no circuit parts such as bus bars or fuses. The laminate battery module 100 is as a result less prone to suffer short circuits.

In the embodiment described above, the outgassing region A1 is set on the side opposite the side from which the positive electrode collector tab 27 and the negative electrode collector tab 28 protrude, but the present disclosure is not limited thereto. For instance the outgassing region A1 may be set on a side adjacent to the side from which the positive electrode collector tab 27 and the negative electrode collector tab 28 protrude.

When a laminate battery is used such that the positive electrode collector tab 27 and the negative electrode collector tab 28 protrude from the sealing portion 40s on respective different sides, the outgassing region A1 may be set at a side other than the sides from which the positive electrode collector tab 27 and the negative electrode collector tab 28 protrude.

Figure 7:
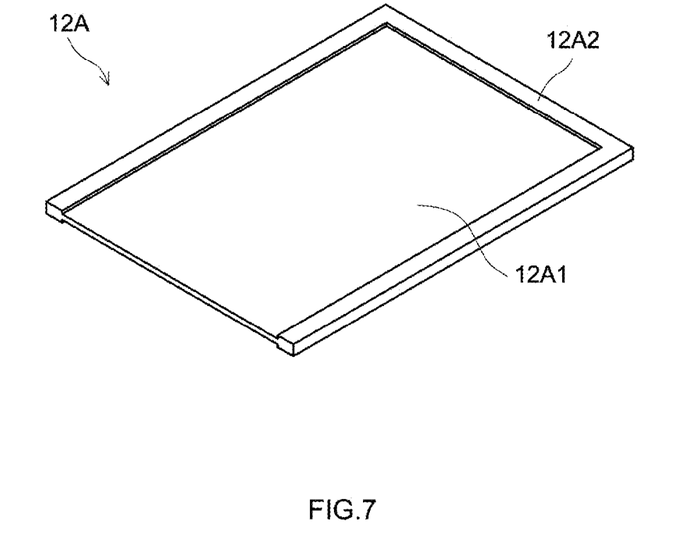
FIG. 7 is a perspective-view diagram illustrating schematically a thermal expansion member 12A.
Figure 8:
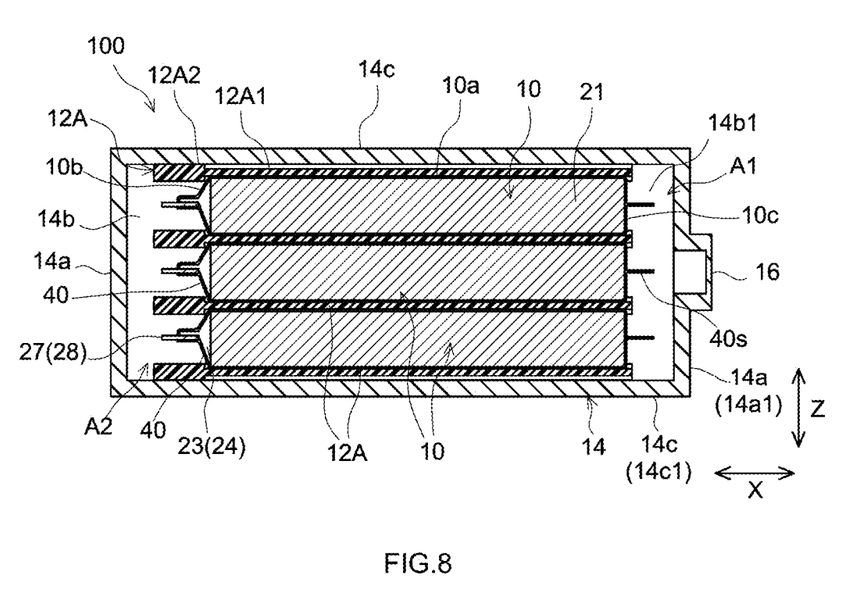
FIG. 8 is a cross-sectional diagram illustrating schematically a laminate battery module 100 in which a thermal expansion member 12A is used.
Figure 9:
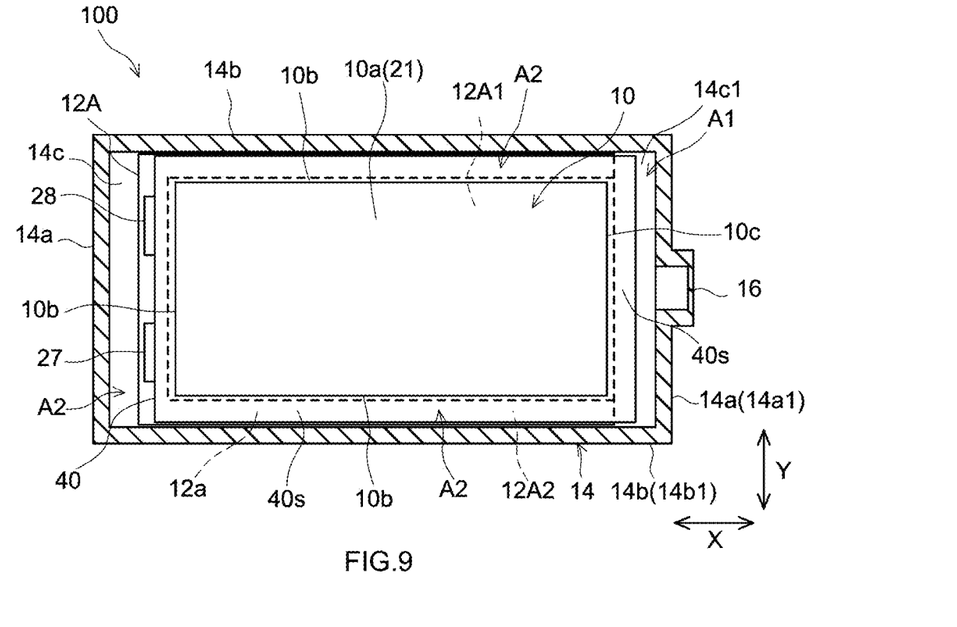
FIG. 9 is a cross-sectional diagram illustrating schematically a laminate battery module 100 in which a thermal expansion member 12A is used.

In the embodiment illustrated in FIG. 4 and FIG. 5, each thermal expansion member 12 is shaped as a sheet of constant thickness. However, the shape of the thermal expansion member 12 is not limited thereto. A thermal expansion member 12A may partially have for instance a thicker portion. FIG. 7 is a perspective-view diagram illustrating schematically a thermal expansion member 12A. FIG. 8 and FIG. 9 are cross-sectional diagrams illustrating schematically a laminate battery module 100 in which the thermal expansion member 12A is used. FIG. 8 illustrates laminate batteries 10 and thermal expansion members 12A alternately laid up on each other. FIG. 9 illustrates the positional relationship between the laminate batteries 10 and thermal expansion members 12A in plan view from the arraying direction Z.

As illustrated in FIG. 7, each thermal expansion member 12A has a substantially rectangular sheet shape. A portion (hereafter also referred to as step portion) 12A2, the thickness of which is relatively greater than that of a central portion 12A1, is continuously provided on three sides of the peripheral edge of the thermal expansion member 12A. In the present embodiment the step portion 12A2 is provided on both faces of the thermal expansion member 12A. The material used as the thermal expansion member 12 described above can be processed through injection molding or extrusion molding, to yield the thermal expansion member 12A.

As illustrated in FIG. 8 and FIG. 9, the wide surface 10*a* of each laminate battery 10 overlaps the central portion 12A1. The step portion 12A2 is provided at a portion 12*a* protruding from the wide surface 10*a*. In other words, each thermal expansion member 12A includes, at the portion 12*a* that protrudes from the wide surface 10*a*, a portion step portion 12A2) that is thicker than the portion that does not protrude from the wide surface 10*a*. Such a thermal expansion member 12A is suitably used for instance in a laminate battery module 100 that utilizes thick laminate batteries 10. Moreover, the laminate batteries 10 can be positioned by using the step portion 12A2 as a guide.

In the embodiment illustrated in FIG. 7, the step portion 12A2 is provided continuously on three sides of the peripheral edge of the thermal expansion member 12A, but the step portion 12A2 is not limited to such a form. The step portion can be designed as appropriate for instance in accordance with the shape of the laminate battery or the expansion factor of the thermal expansion member. For instance the step portion may be provided on one side, or on two sides, of the peripheral edge of the thermal expansion member. The thick portion may be provided intermittently on the peripheral edge of the thermal expansion member.

Concrete examples of the present disclosure have been explained in detail above, but the examples are merely illustrative in nature, and are not meant to limit the scope of the claims in any way. The disclosure disclosed herein encompasses various alterations and modifications of the concrete examples illustrated above.

What is claimed is:

1. A laminate battery module, comprising:
   a plurality of laminate batteries; and
   a plurality of thermal expansion members,
   wherein each of the plurality of laminate batteries has
      an exterior body made up of a laminate film, and
      an electrode body accommodated in the exterior body,
   wherein the exterior body in each of the plurality of laminate batteries has
      a wide surface, and
      a sealing portion provided in a periphery of the wide surface, at which the laminate film is overlaid thereby, to seal a space in which the electrode body is accommodated,
   wherein the electrode body has a positive electrode collector tab and a negative electrode collector tab protruding from the sealing portion,
   wherein the plurality of laminate batteries are arrayed sequentially in a manner that the wide surfaces of the plurality of laminate batteries oppose each other, with an outgassing region being set in a pre-determined part of the periphery of the wide surfaces, and
   wherein
   the plurality of thermal expansion members is interposed between the wide surfaces of the plurality of laminate batteries,
   each of the plurality of thermal expansion members has a portion protruding beyond an end of the electrode body in a length direction of the plurality of laminate batteries and extending in the length direction in a region in the periphery of the wide surfaces, excluding the outgassing region, and
   the portions of the plurality of thermal expansion members are configured to, in response to a pre-determined temperature being exceeded, expand and fill the region in the periphery of the wide surfaces, excluding the outgassing region.

2. The laminate battery module according to claim 1, wherein the positive electrode collector tab and the negative electrode collector tab overlap the plurality of thermal expansion members in plan view.

3. The laminate battery module according to claim 1, wherein
   the positive electrode collector tab and the negative electrode collector tab protrude from a same side of the sealing portion; and
   the outgassing region is set on a side opposite the side from which the positive electrode collector tab and the negative electrode collector tab protrude.

4. The laminate battery module according to claim 1, further comprising an exterior case in which the plurality of laminate batteries and the plurality of thermal expansion members are accommodated in a sealed state,
   wherein the exterior case has a safety valve.

5. The laminate battery module according to claim 4, wherein the safety valve is provided at a position surrounding the outgassing region.

6. The laminate battery module according to claim 1, wherein each of the plurality of thermal expansion members has
   the portion protruding from the wide surfaces and extending in the length direction of the plurality of laminate batteries, and
   a further portion extending in the length direction but not protruding from the wide surfaces, the portion being thicker than the further portion in a thickness direction of the plurality of laminate batteries.

7. The laminate battery module according to claim 1, further comprising an exterior case in which the plurality of laminate batteries and the plurality of thermal expansion members are accommodated in a sealed state, wherein
   the plurality of laminate batteries are distanced away from an inner surface of the exterior case by a space defining the outgassing region set in the pre-determined part of the periphery of the wide surfaces.

8. The laminate battery module according to claim 7, wherein the exterior case has a safety valve positioned on a same side of the outgassing region to allow gas that is generated from any one of the plurality of laminate batteries to be released through the side of the outgassing region.

9. The laminate battery module according to claim 8, wherein the safety valve is positioned on an opposite side of the positive and negative electrode collector tabs in the length direction of the plurality of laminate batteries.

10. The laminate battery module according to claim 9, wherein
    the exterior case has a pair of first side walls perpendicular to the length direction of the plurality of laminate batteries, and a pair of second side walls perpendicular to a thickness direction of the plurality of laminate batteries, and
    the outgassing region is surrounded by the pair of second side walls and one of the pair of the first side walls.

11. The laminate battery module according to claim 10, wherein the safety valve is positioned on the one of the pair of first side walls.

12. The laminate battery module according to claim 1, wherein the pre-determined temperature is at least 100° C.

13. The laminate battery module according to claim 12, wherein an expansion factor of each of the plurality of thermal expansion members is in a range between 5 and 40.

14. The laminate battery module according to claim 13, wherein each of the plurality of thermal expansion members has
- a thermal conductivity prior to heating, and a reduced thermal conductivity after heating lower than the thermal conductivity prior to heating, and
- a thermal resistance prior to heating, and an increased thermal resistance by expanding in a thickness direction of the plurality of thermal expansion members.

* * * * *